(12) United States Patent
Spartano et al.

(10) Patent No.: US 7,850,330 B2
(45) Date of Patent: Dec. 14, 2010

(54) LIGHTING DEVICE CONFIGURED TO OPERATE WITH DIFFERENT BATTERIES

(75) Inventors: David A. Spartano, Brunswick, OH (US); Frank F. Huang, Lakewood, OH (US); Waikwong Lam, Tsueng Kwan O (HK)

(73) Assignee: Eveready Battery Co., Inc., St. Louis, MO (US)

( * ) Notice: Subject to any disclaimer, the term of this patent is extended or adjusted under 35 U.S.C. 154(b) by 9 days.

(21) Appl. No.: 12/246,661

(22) Filed: Oct. 7, 2008

(65) Prior Publication Data

US 2010/0046211 A1 Feb. 25, 2010

Related U.S. Application Data

(60) Provisional application No. 61/090,429, filed on Aug. 20, 2008.

(51) Int. Cl.
*F21L 4/00* (2006.01)
*H01M 4/00* (2006.01)

(52) U.S. Cl. ................ 362/194; 362/195; 362/203; 362/206

(58) Field of Classification Search ............ 362/183, 362/194, 157, 203, 201, 195; 320/110, 112, 320/114, 116, 107

See application file for complete search history.

(56) References Cited

U.S. PATENT DOCUMENTS

| | | | |
|---|---|---|---|
| 3,758,773 A * | 9/1973 | Nau | 362/157 |
| 5,167,447 A | 12/1992 | Gonzales | |
| 5,909,062 A | 6/1999 | Krietzman | |
| 6,046,572 A | 4/2000 | Matthews et al. | |
| 6,505,952 B1 * | 1/2003 | Kish et al. | 362/197 |
| 6,851,828 B1 * | 2/2005 | Hansen | 362/203 |
| 6,942,359 B2 | 9/2005 | Furth et al. | |
| 2007/0145912 A1 | 6/2007 | Spartano et al. | |

OTHER PUBLICATIONS

U.S. Appl. No. 12/202,486, filed Sep. 2, 2008.
JetBeam JET-1, Flashlight Reviews and LED Modifications, www.flashlightreviews.com/reviews/jetbeam_jet-1.html, 10 pages, (c)2001-2006 Doug Pribis.
Patent Cooperation Treaty (PCT), International Search Report and Written Opinion for Application PCT/US2009/004633 filed Aug. 13, 2009, Mailed Feb. 2, 2010, Korean Intellectual Property Office, Republic of Korea.

* cited by examiner

*Primary Examiner*—Anabel M Ton
(74) *Attorney, Agent, or Firm*—Gregory J. Adams

(57) ABSTRACT

A lighting device in the form of a handheld flashlight is provided that includes a plurality of light sources located within a swivel head pivotally connected to a main body. The main body has a yoke portion connected to the swivel head by a head attachment mechanism that includes locking detents to lock the swivel head into one of a plurality of positions. The lighting device also has a tail cap that engages the main body by way of a cam lock wheel to provide a closure to the battery compartment. The lighting device further includes multiple modes of operation having a plurality of switches that provide control in various lighting modes. The lighting device is configured to be powered by one number of batteries supplying a first voltage output and is configured to be powered by a second different number of batteries supplying a second different voltage output, and the batteries are installed in battery compartments and include spring biased contacts for ensuring proper orientation of the batteries.

13 Claims, 14 Drawing Sheets

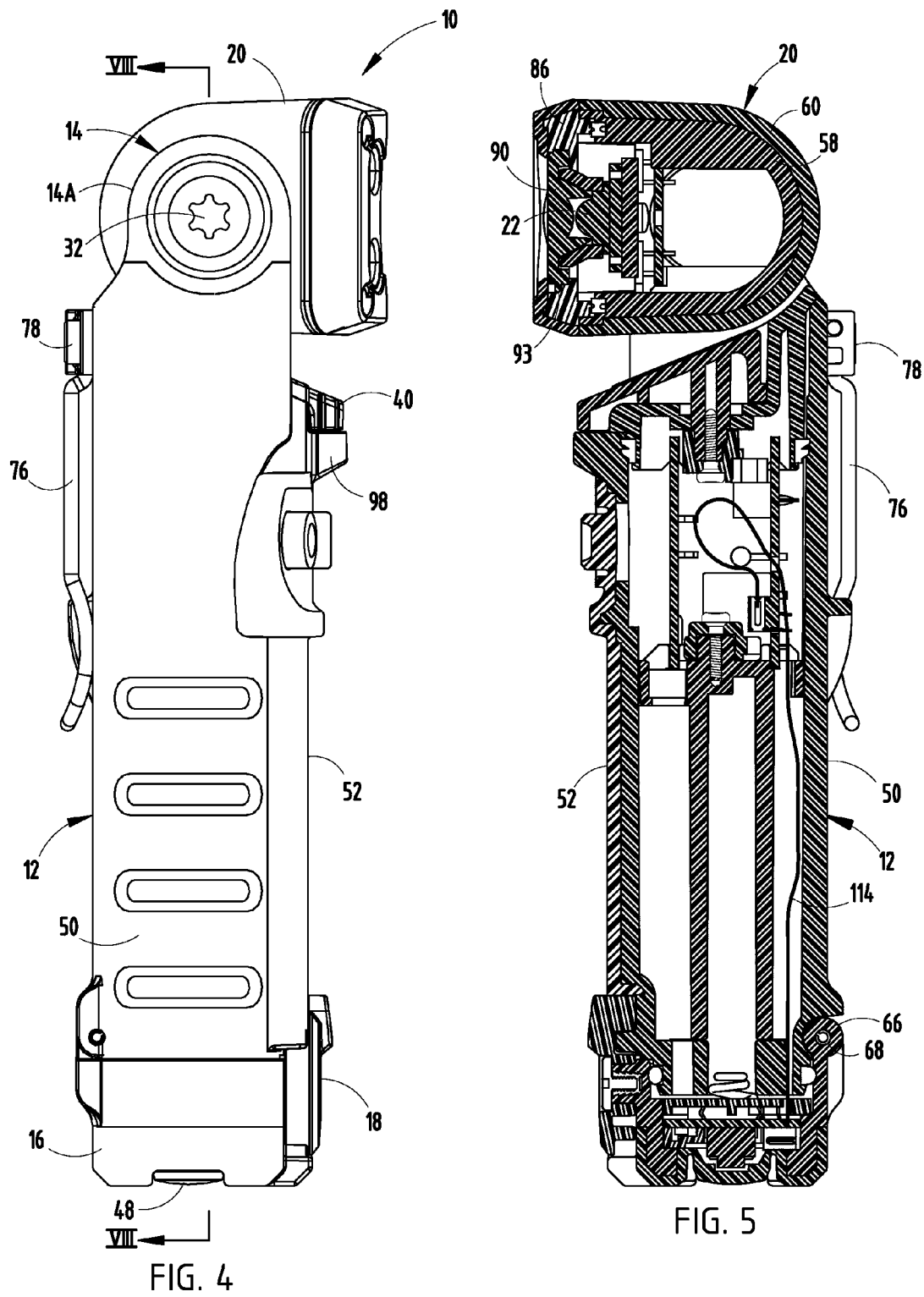

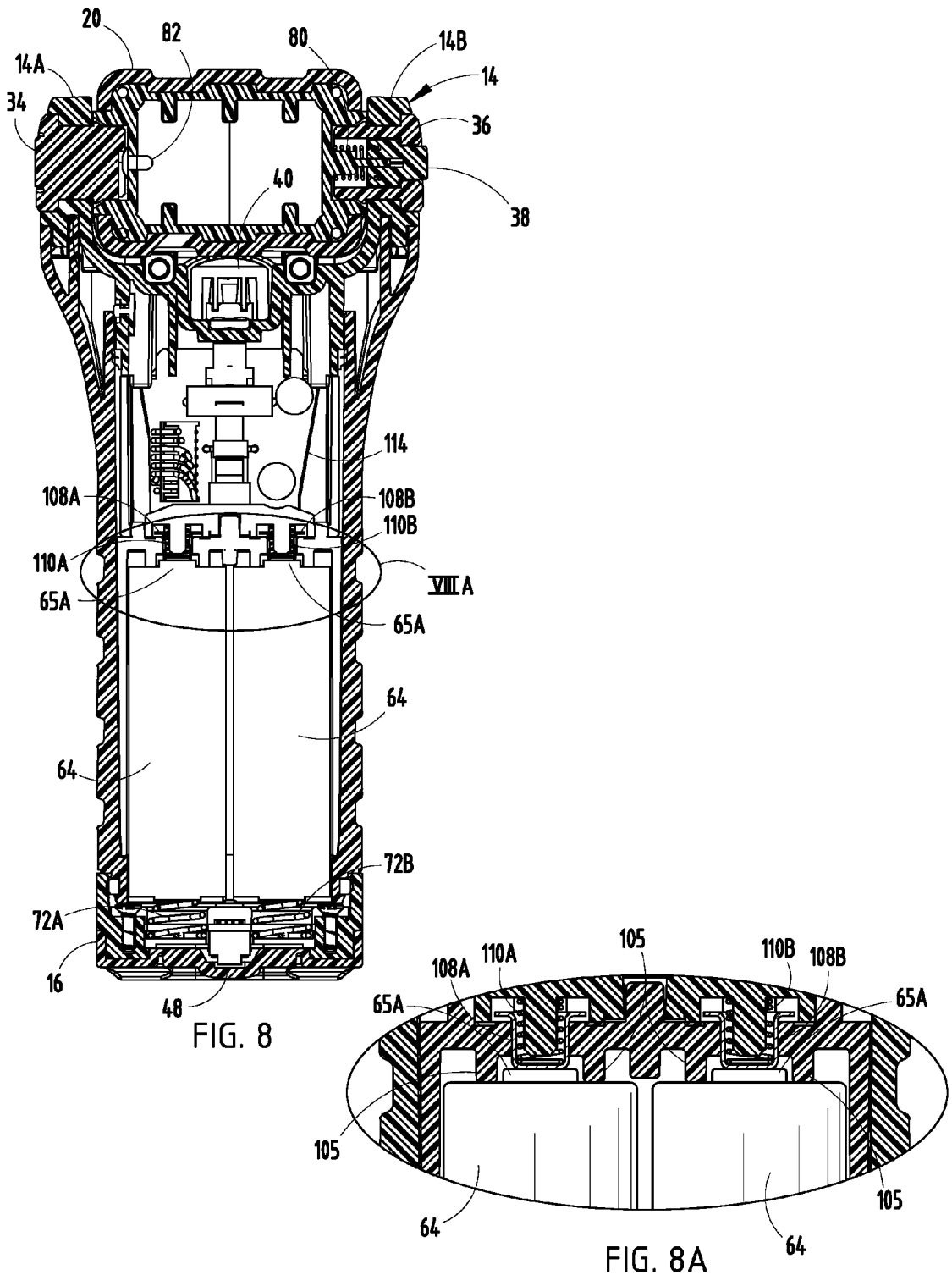

LIGHTING DEVICE CONFIGURED TO OPERATE WITH DIFFERENT BATTERIES

CROSS-REFERENCE TO RELATED APPLICATION

This application claims the benefit under 35 U.S.C. §119(e) of U.S. Provisional Patent Application No. 61/090,429 filed on Aug. 20, 2008, the entire disclosure of which is hereby incorporated herein by reference.

BACKGROUND OF THE INVENTION

The present invention generally relates to lighting devices and, more particularly, to multifunctional lighting devices, such as flashlights that offer multiple lighting options, control of such lighting options and multiple modes of operation.

Portable lighting devices, such as flashlights, generally employ a light source, such as an incandescent lamp or one or more light emitting diodes (LEDs), a reflector or other optics, and a power source typically employing one or more electrochemical cell batteries. Many handheld lighting devices, commonly referred to as flashlights, generally offer limited functionality and performance. Typically, the conventional flashlight includes a switch located on the outer circumference of the housing that can be activated to alternatively close and open a circuit connection to turn the flashlight on and off. If more than one light source is included in the flashlight, multiple switches typically are provided to control each light source.

It would be desirable to provide for a lighting device that offers enhanced functionality and performance. In particular, it would be desirable to provide for a portable lighting device, such as a flashlight, that may offer enhanced use in the field, such as for military and industrial applications, and for other outdoor use.

SUMMARY OF THE INVENTION

The following presents a simplified summary in order to provide a basic understanding of one or more aspects of the invention. This summary is not an extensive overview of the invention, and is neither intended to identify key or critical elements of the invention, nor delineate the scope thereof. Rather, the primary purpose of the summary is to present some concepts of the invention in a simplified form as a prelude to the more detailed description that is presented later.

In accordance with one aspect of the present invention, a lighting device is provided that includes a light source and a housing generally having walls defining a cavity adapted to receive a plurality of batteries such that one or more of the batteries may serve as a power source to power the light source. The lighting device also includes boost circuitry for boosting a voltage output of the one or more batteries to power the light source. The light source is configured to be powered by one number of batteries supplying a first voltage output and is configured to be powered by a second different number of batteries supplying a second different voltage output.

According to another aspect of the present invention, a lighting device is provided that includes a light source and a housing generally having walls defining a cavity adapted to receive a plurality of batteries, such that one or more of the plurality of batteries may serve as a power source to power the light source. The lighting device also includes a first battery compartment configured to receive at least a first battery, the first battery compartment comprising a first contact that is in a contact state when the at least first battery is properly positioned in the first battery compartment and is in a non-contact state when the at least first battery is not properly positioned in the first battery compartment. The lighting device also includes a second battery compartment configured to receive the at least a second battery. The second battery compartment comprises a second contact that is in a contact state when the second battery is properly positioned within the second battery compartment and is in a non-contact state when the at least second battery is not properly positioned in the second battery compartment.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 4 is a left side view of the lighting device shown in FIG. 1 with the swivel head in a first locked position;

FIG. 5 is a cross-sectional view of the lighting device taken through line V-V of FIG. 3;

FIG. 8 is a cross-sectional view of the lighting device taken through line VIII-VIII of FIG. 4;

FIG. 8A is an enlarged view of section VIII-VIII of FIG. 8 further illustrating electrical connection of the batteries to electrical circuitry in the lighting device;

DETAILED DESCRIPTION OF THE PREFERRED EMBODIMENTS

Figure 1:
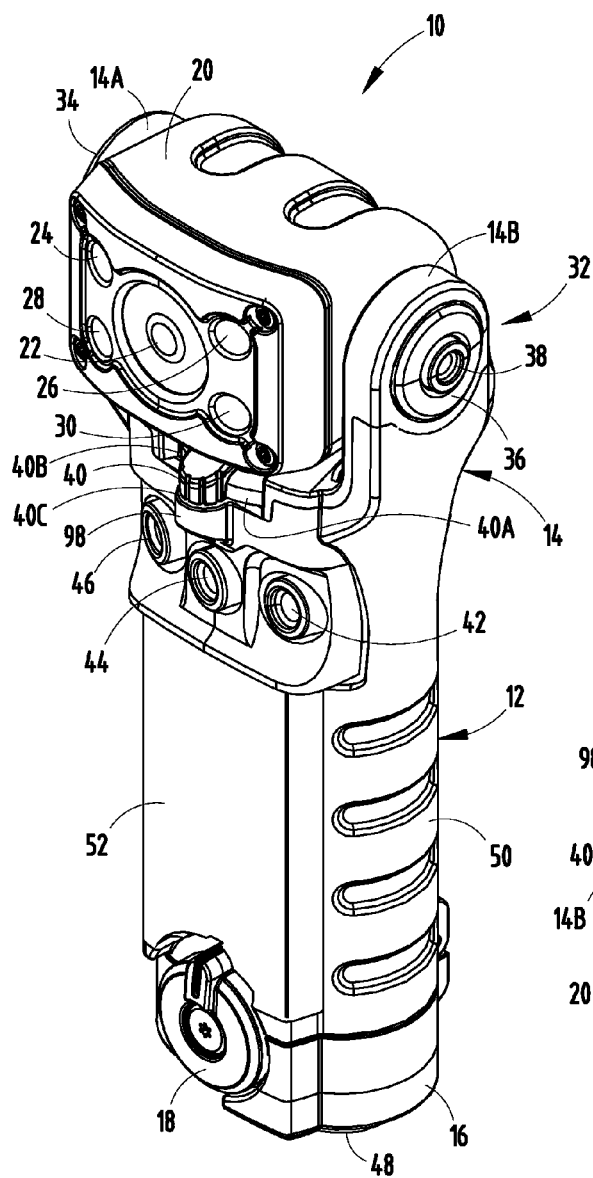
FIG. 1 is an upper front perspective view of a lighting device, according to one embodiment.

Before describing in detail embodiments that are in accordance with the present invention, it should be observed that the embodiments reside primarily in combinations of method steps and apparatus components related to a lighting device and method of operating thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like reference characters in the description and drawings represent like elements.

In this document, relational terms, such as first and second, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

Referring now to FIGS. 1-12, a lighting device 10 is generally illustrated embodied as a handheld lighting device, also referred to herein as a flashlight that is portable and adapted to be handled by a user to provide light illumination, according to one embodiment. While the lighting device 10 is shown and described herein as a handheld flashlight, it should be appreciated that the lighting device 10 may be employed with one or more mounting structures that enable the lighting device 10 to be mounted onto a supporting structure, including an article of clothing, such as a shirt, a vest, a helmet, a ball cap, or may be mounted onto other structures, such as firearms to assist with military or hunting applications. The lighting device 10 is configured to operate in multiple modes of operation and can be used as a flashlight (spot or flood), an exterior light, an automotive light, a table light, a desk light, and the like.

As shown in FIGS. 1-7D, the lighting device 10 generally includes a main housing body 12 that is generally elongated and adapted to be received within and gripped by the hand of a user. The body 12 generally has walls that define a compartment within the interior that is adapted to receive one or more batteries as the power source, generally within a battery cartridge 100. The compartment with body 12 further contains electrical circuitry and controls. The body 12 also includes a yoke portion 14 having a pair of upward extending arms 14A and 14B extending from one end that engages a swivel head 20 by way of a head attachment mechanism 32. Each of arms 14A and 14B has an opening for receiving left and right swivel connectors 34 and 36 that connect the swivel head 20 thereto.

The swivel head 20 includes one or more light sources. In the embodiment shown and described herein, the swivel head 20 includes five light sources embodied as light emitting diodes (LEDs) 22, 24, 26, 28 and 30. The swivel head 20 may be rotated to swivel amongst a plurality of positions to selectively provide light illumination oriented in a desired one of a plurality of directions. In the disclosed embodiment, the swivel head locks into fixed positions at two locations.

Figure 2:
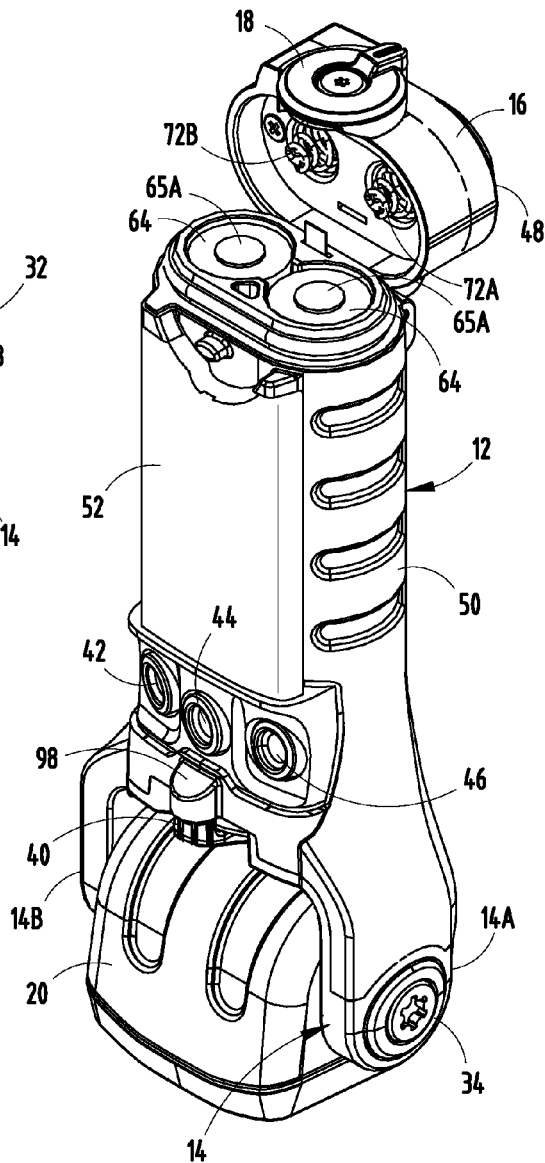
FIG. 2 is a lower front perspective view of the lighting device shown in FIG. 1 with the swivel head rotated to a second locked position and the end cap in the open position.
Figure 3:
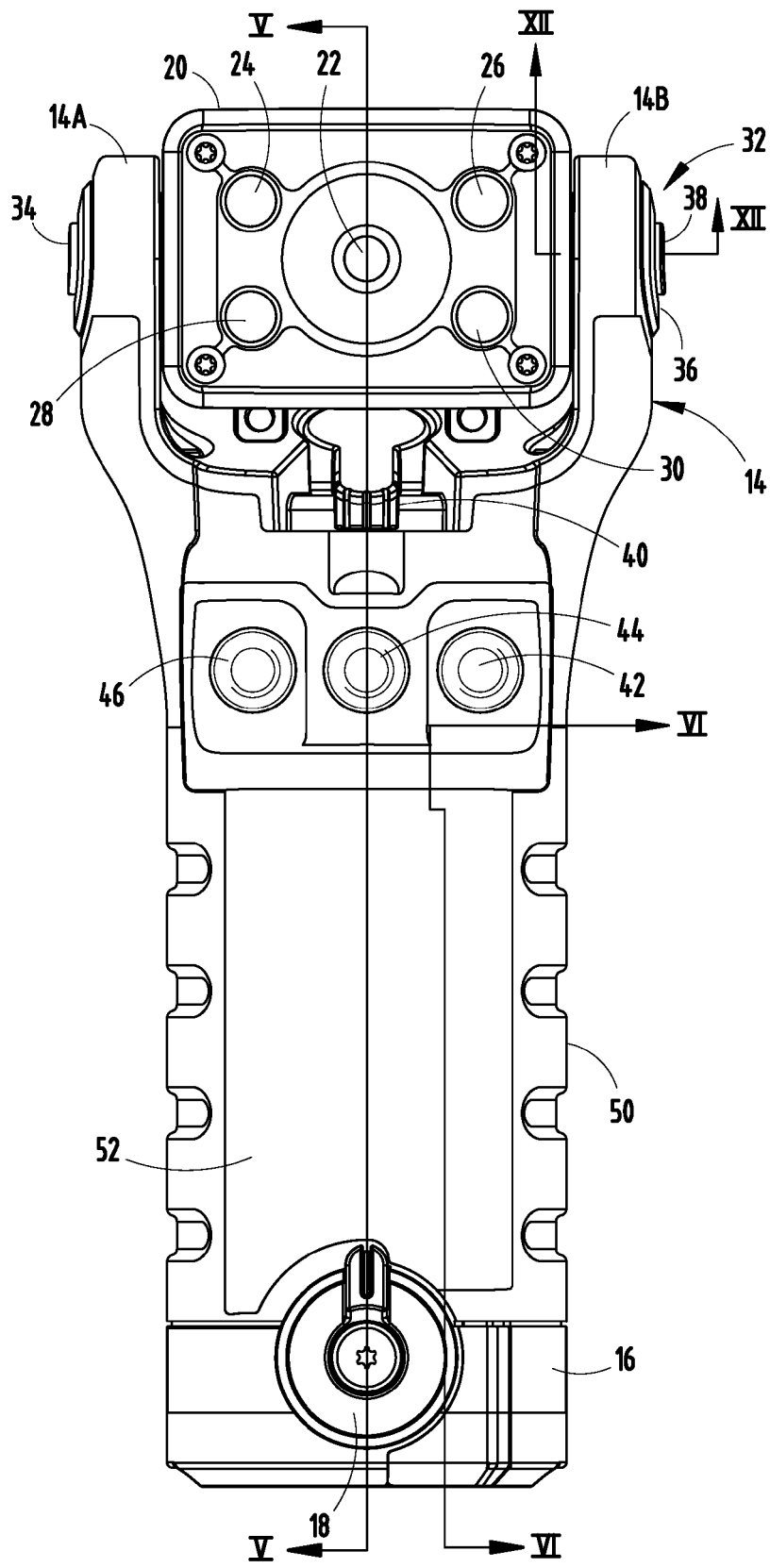
FIG. 3 is a front view of the lighting device shown in FIG. 1.

The main body 12 has a pivoting bottom end or tail cap 16 at the end opposite from the yoke portion 14. The end cap 16 pivots relative to the body 12 and has a locking mechanism that is user actuatable to open or close the end cap 16. The end cap 16 may be opened as shown in FIG. 2 to expose the battery compartment to allow a user to remove batteries 64 from and insert batteries 64 into the battery compartment.

The end cap 16 is pivotally connected to the main body 12 by way of a pivot connection. The pivot connection may be in the form of a hinge having hinge members 66A and 66B formed on the end cap 16 and body 12, respectively, that align and a pin 68 extending through aligned openings in the hinge members 66A and 66B, according to one embodiment. Attached to the end cap 12 is a lock mechanism having rotating cam lock wheel 18 which includes a cam surface formed on the inside for engaging a protruding member, such as a tooth 132, on the outer wall of the main body 12. To close the end cap 12, the end cap 16 is rotated to a partial closed position and the cam lock wheel 18 is then rotated clockwise such that the cam surface engages the protruding member 132 to forcibly translate rotational movement of the wheel 18 to pivoting movement of the end cap 16 to move the end cap 16 towards the main body 12 with sufficient force to engage and compress a seal 160 disposed between the end cap 16 and the main body 12. Thus, a sealed closure is provided. To open the end cap 16, the cam lock wheel 18 is rotated counterclockwise such that the protruding member 132 comes out of engagement with the cam surface so that the end cap 16 is free to be rotated to the fully open position.

The lighting device 10 includes five light sources in the form of LEDs 22, 24, 26, 28 and 30, all assembled in the swivel head 20 and facing in the same general forward direction, according to one embodiment. LED 22 is generally located in the middle region of the front face of the swivel head 20 and is implemented as a white LED, also referred to as a non-colored LED for projecting visible non-colored white light illumination. The remaining four LEDs are generally located near the four corners of the front face of the swivel head 20. LED 24 may be implemented as a blue colored LED for emitting a beam of visible blue colored light in a blue colored illumination beam. LED 26 may be implemented as a red colored LED for emitting a beam of visible red colored light in a red colored illumination beam. LED 28 may be implemented as a green colored LED for emitting a beam of visible green colored light. LED 30 may be implemented as an infrared (IR) LED for emitting a forward projecting beam of infrared (IR) illumination, according to one embodiment. It should be appreciated that the various colored and non-colored light sources may be implemented in different patterns and arranged in different locations, and may further have different output illuminations, according to other embodiments.

In the disclosed embodiment, the white main LED 22 generally provides a higher light intensity than the other light sources 22, 26, 28 and 30. According to one embodiment, the white LED 22 may typically be driven by one AA-size alkaline battery at a current of approximately 150 milliamps to achieve about 75-80 lumens of light illumination, or may be driven by two series connected alkaline batteries at a current of about 275 milliamps to generate about 75-80 lumens of light illumination. The colored LEDs 24, 26 and 28 and the IR LED 30 may typically be driven with one alkaline battery at approximately 30 milliamps to achieve in the range of about 1-10 lumens of light illumination or driven with two alkaline batteries at approximately 50 milliamps to achieve in the range of about 1-10 lumens of light illumination for each light source. It should be appreciated that other batteries such as lithium batteries may be employed to achieve greater power capacity.

The lighting device 10 may operate on power supplied by one battery cell or two batteries, according to one embodiment. In doing so, the lighting device 10 employs control circuitry to maintain sufficient electrical power output to drive the one or more light sources under conditions when either one or two batteries are employed. Further, the light intensity of the light sources may be adjusted to low, medium and high intensity settings. In a medium intensity setting, the light source may be powered at about fifty percent of the high power setting, and in the low power setting, the light source may be powered at twenty-five percent of the high power setting. It should be appreciated that the main white LED 22 thereby serves as the main light source for providing the greatest amount of illumination. However, it should be appreciated that the amount of illumination achieved with each of the lighting sources 22, 24, 26, 28 and 30 may be varied, according to other embodiments.

The lighting device 10 is further configured with a plurality of user actuatable control switches for controlling activation and illumination of the light sources 22, 24, 26, 28 and 30. A first switch 40, shown implemented as a three-position toggle switch, is located on the front side of the main body 12 below the swivel head 20 and generally in a convenient location to be actuated by the thumb of a user gripping the main body 12. The three-position toggle switch 40 has three switch positions, namely a first switch position 40A on the right side that enables the visible LEDs to be actuated in a visible LED enabled mode, a second switch position 40B on the left side that enables the infrared LED to be actuated in either the IR or IFF enabled mode, and a third switch position 40C in the center that serves as a lockout mode such that none of the LEDs can be turned on. In the central lockout mode position 40C, the control arm of the toggle switch 40 is substantially aligned with an outward protruding switch guard member 98 that serves to prevent accidental or inadvertent actuation of the toggle switch 40. The outward protruding switch guard member 98 generally has a shape and size that extends outward from the main body 12 by a distance the same as or greater than the control arm of the toggle switch 40 and can be formed as an integrally molded member from the main body 12. Thus, the outward protruding member 98 serves as a protective guard.

The lighting device 10 also includes three user-depressible push button switches 42, 44 and 46 located generally below the toggle switch 40 and actuatable conveniently by the thumb of a user holding the main body 12. With the three position toggle switch 40 in the visible LED enabled position 40A, push button switch 42 may be actuated (depressed) to control the green LED to turn the green LED on and off, and may further be actuatable (depressed) to control illumination intensity (brightness) of the green LED. With switch 40 in the visible LED enabled position 40A, switch 44 may be actuated to control the red LED so as to turn the red LED on and off, and to further control the illumination intensity of the red LED. With switch 40 in the visible LED enabled position 40A, switch 46 may likewise be actuated to control the blue LED so as to turn on the blue LED and to further control the illumination intensity of the blue LED.

It should be appreciated that each of the push button switches 42, 44 and 46 are operable to control the corresponding LEDs 24, 26 and 28 when the three-position toggle switch 40A is in the visible LED enabled position 40A so as to turn on the corresponding colored light sources 24, 26 and 28. Each of the push button switches 42, 44 and 46 is further actuatable, generally within a two second window, to adjust the intensity or brightness of the corresponding colored light sources 24, 26 and 28. A two second window is provided to allow a user to control the intensity of the light source once the corresponding light source is turned on. If the user depresses one of push button switches 42, 44 or 46 within two seconds of turning on the corresponding light source, then the brightness of the corresponding light source may be adjusted. If a user waits for longer than the two second time period to subsequently depress one of push button switches 42, 44 and 46, the subsequent depression of the switch will turn off the corresponding light source. According to one embodiment, any of switches 40, 42 and 44 may be actuated repeatedly to turn the corresponding light source on and off and to sequentially change intensity of the colored light emitted by the corresponding light sources among a plurality of brightness settings, including high, medium and low intensity settings. The intensity or brightness of the light sources may be adjusted according to a predetermined sequence. According to one embodiment, the light sources may be turned at a low intensity setting and may be subsequently adjusted in intensity to sequence from the low brightness setting to a medium brightness setting to a high brightness setting and repeat the sequence or reverse the order of the sequence. According to another embodiment, the light sources may be turned on at a high brightness setting and subsequently adjusted sequentially to a medium brightness setting, then a low brightness setting, and repeat the sequence or reverse the order of the sequence. Additionally, it should be appreciated that some of the light sources, such as the white light LED 20 may be turned on at the highest intensity setting, whereas a colored light LED such as LEDs 22, 24 and 26 may be turned at a low intensity setting so as to provide for a less noticeable light illumination which may be desirable for hunting or military applications. According to another embodiment, the switches 40, 42 and 44 may be further actuated, within the two second window, by continuous depression so as to adjust the colored light intensity of the corresponding light source at more incremental settings by ramping the visible light intensity up and down.

The lighting device 10 further includes a user depressible push button switch 48 located in the bottom end of the end cap 16. Switch 48 is actuatable by a user to control the main white LED 22 when the three-position toggle switch 40 is in the visible LED enabled position 40A such that depression of switch 48 turns on the main white light source 22, and may further change intensity of the main white light source 22 by continued depression of the switch 48 within a two second window. Accordingly, if a user depresses switch 48 to turn on the white LED 22, any subsequent depression within the two second window will adjust the intensity of the white light in a sequence, such as to switch from a high to a medium and then to low brightness setting sequence or in a ramped fashion to ramp the brightness of the light source incrementally up and down. If the three-position toggle switch 40 is in the IR/IFF enabled position 40B, then the infrared light source 30 will turn on in the infrared (IR) mode to provide continuous IR with no blinking and, if switch 48 is depressed, then the lighting device 10 will enter the IFF or SOS mode in which the infrared LED 30 blinks at a specified rate for purposes of IFF or SOS. Accordingly, it should be appreciated that the three-position toggle switch 40 may be utilized to select between the visible LED mode and the IR/IFF mode, and the push button switch 48 may be employed to control the white LED 20 or IR LED 30 depending upon the selected mode.

According to one embodiment, the infrared light source 30 is employed as an identification friend or foe (IFF) light source, which is particularly useful for military applications. The IFF light source 30 may be implemented with the infrared LED generating an infrared identifier beam that is generally invisible to the naked human eye, which in a military use serves as a friendly party member indicator. According to one embodiment, the IFF light source 30 may operate intermittently to provide a blinking signal at a predetermined rate or pattern that may be viewable by other persons with the use of night vision equipment (e.g., night vision goggles).

According to another embodiment, the infrared light source 30 may be employed as an SOS light source. The light source 30, in the SOS embodiment, may be implemented as a visible light source that is generally visible to the human eye and may operate intermittently to provide a blinking visual light signal at a predetermined rate or pattern that may be visible by other persons.

The lighting device 10 is further equipped with a test mode that enables a test to check whether all of the LEDs are properly operating. To initiate the test mode, switches 42 and 46 are simultaneously depressed. Upon initiation of the test mode, the various light sources 20, 22, 24, 26 and 28 automatically cycle through a predetermined sequence. This enables an assembler in a manufacturing facility or a user in the field to verify that the various light sources are operating properly.

Figure 7:
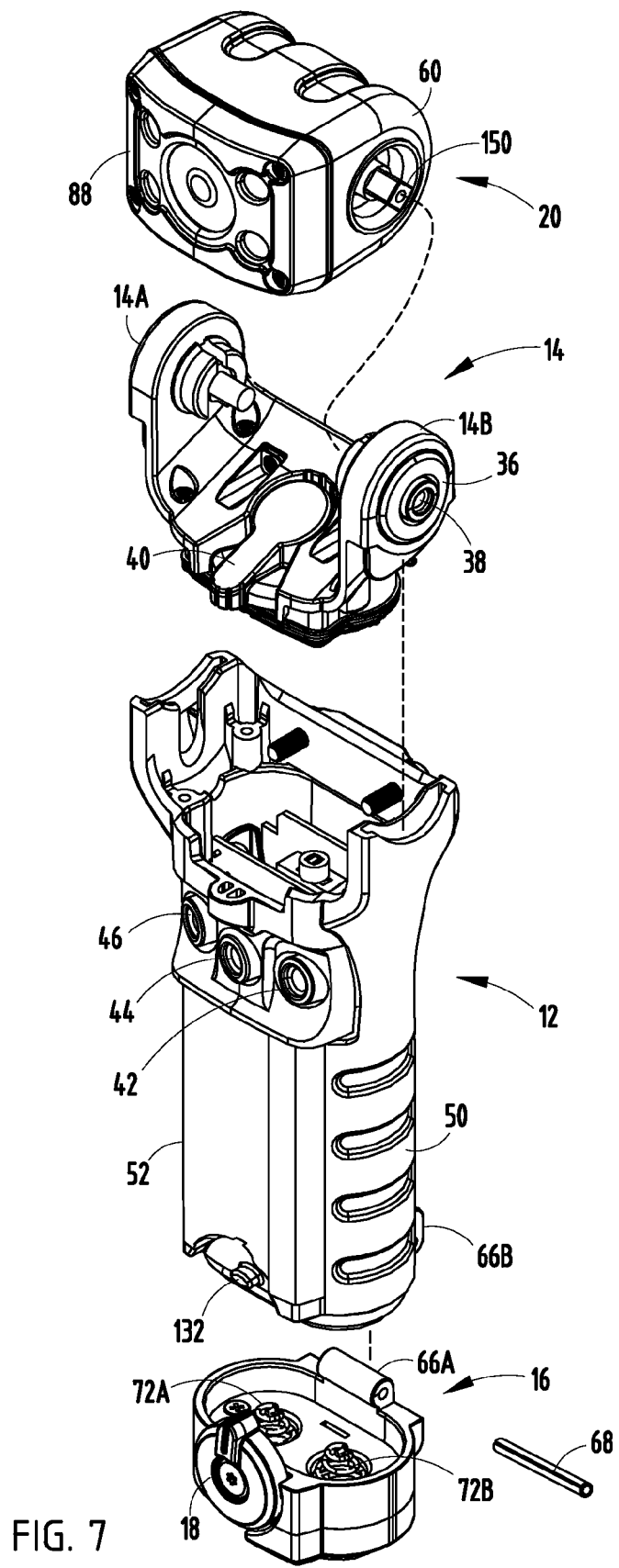
FIG. 7 is an exploded assembly view of the lighting device shown in FIG. 1.
Figure 7A:
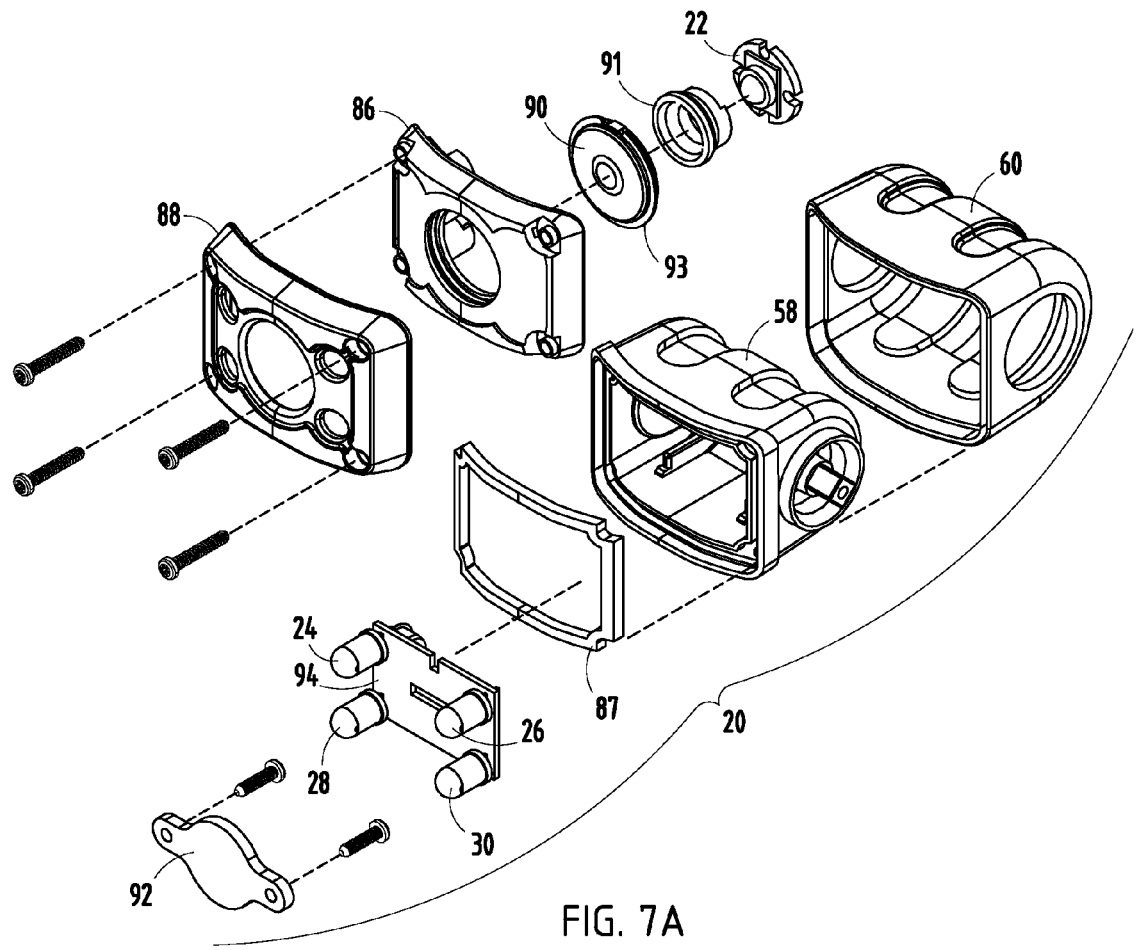
FIG. 7A is an exploded assembly view of the swivel heading shown in FIG. 7.

The white LED 22 is shown in FIG. 7A generally mounted to a thermally conductive LED heat sink 92, which generally includes openings for terminals to provide electrical power to the LED 22. The heat sink 92 conducts thermal energy away from the LED 20. A lens, in the form of a total internal reflectance (TIR) lens 90, is disposed in front of the main white LED 22 for focusing the white light beam illumination in a desired beam pattern. The TIR lens 90 may be made of a thermoplastic and transparent plastic, also referred to as acrylic glass. One example of a suitable acrylic glass is polymethyl methacrylate (PMMA). In one embodiment, the TIR lens 90 may include a TIR rebel lens with an O-ring frame 91 that may be injection molded. The TIR lens 90 has a flange 93 that is provided to allow a hard polymeric material of front housing member 86 to be molded therewith. By molding the hard polymeric material 86 around the flange 93 of TIR lens 90, a watertight seal is formed during the molding operation. A soft elastomeric material 88 is then overmolded over the hard plastic material 86.

Also disposed within the swivel head 20 is an LED board 94 with each of the other four LEDs 24, 26, 28 and 30 mounted thereto. The LED board 94 includes contact terminals for providing electrical connection to each of the LEDs 24, 26, 28 and 30. With the internal components including the LEDs 22, 24, 26, 28 and 30, TIR lens 90, heat sink 92 and circuit board 94 disposed within the rear housing 58 and its overmolded elastomeric material 60 of the swivel head 20, the front housing 86 and its overmolded elastomeric material 88 is assembled so as to engage a seal 87 and fasteners (e.g., screws) are installed to form a sealed closure to the swivel head 20.

According to one embodiment, the main white LED 22 may include a Cree XRE, commercially available from Cree, Inc. The colored blue LED may include Part No. GB-333B473C-032, commercially available from Globe Technology Component. The red LED may include Part No. GB-IR224B31C-015, commercially available from Globe Technology Component. The green LED may include Part No. LL-F50SRGBC2E-F1, commercially available from Globe Technology Component. The IR LED 30 may include an invisible IR LED, such as Part No. GB-IR224B31C-015, commercially available from Globe Technology Component. While the main LED 22 is shown having an optical lens in the form of a TIR lens 90 in front thereof, it should be appreciated that the other LEDs 24, 26, 28 and 30 may likewise include a TIR lens or other optical lens.

Figure 7B:
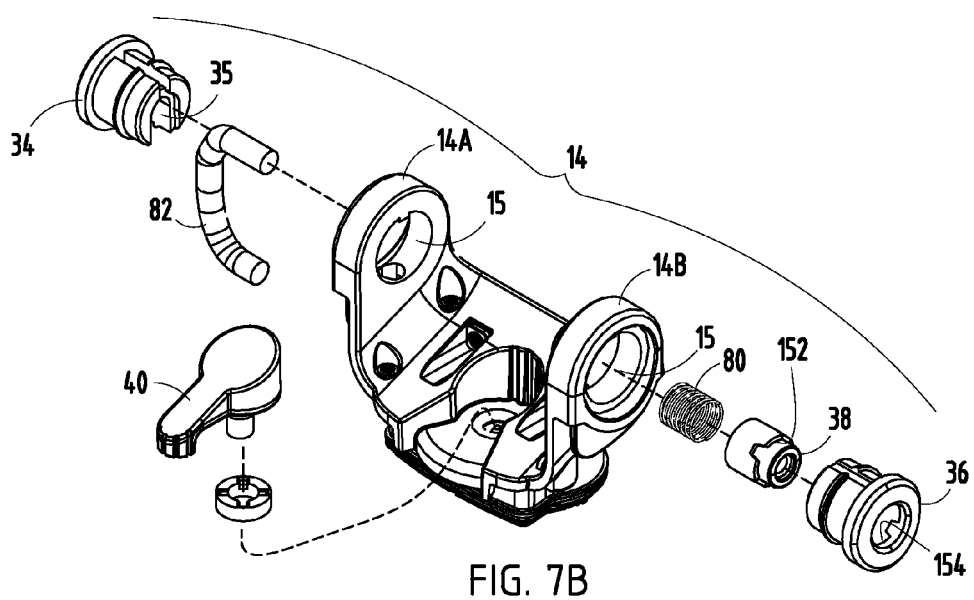
FIG. 7B is an exploded assembly view of the swivel connector shown in FIG. 7.
Figure 7C:
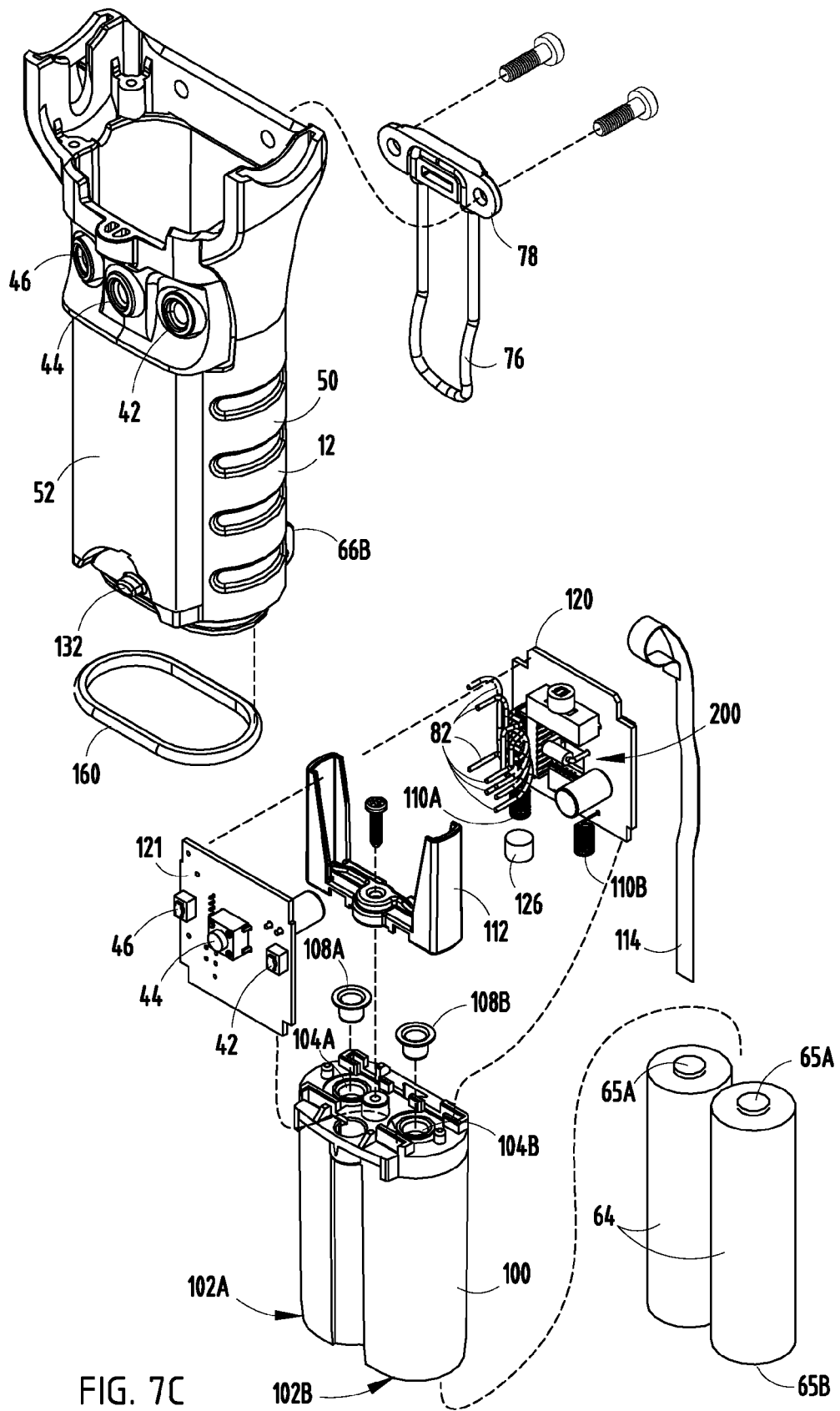
FIG. 7C is an exploded assembly view of the main body shown in FIG. 7.
Figure 7D:
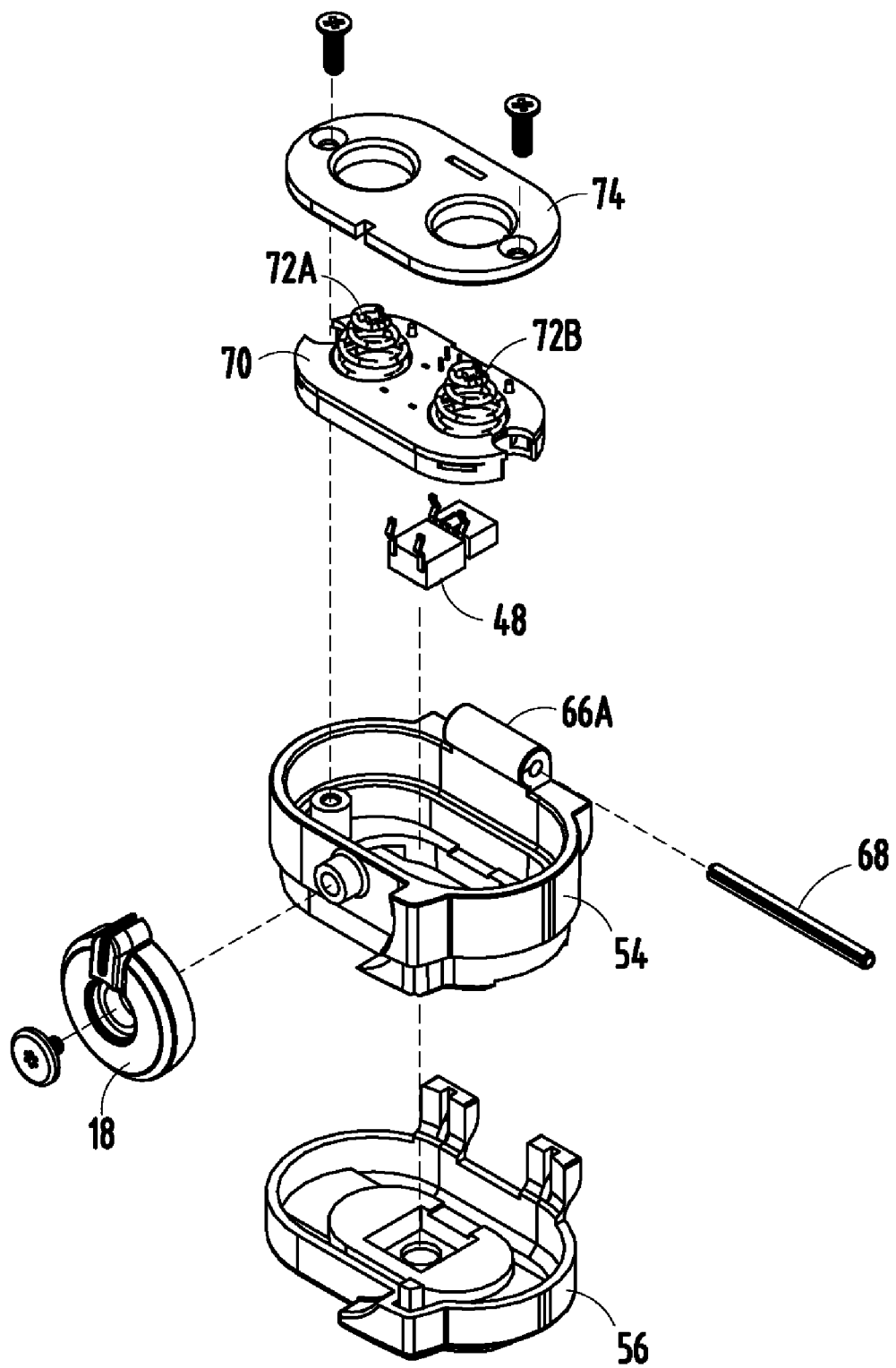
FIG. 7D is an exploded assembly view of the end cap shown in FIG. 7.

With particular reference to FIG. 7C, the main body 12 of the lighting device 10 is shown having various components assembled within the compartment, including the battery cartridge 100 which includes first and second battery compartments or receptacles 102A and 102B configured to receive first and second batteries 64. The batteries 64 are installed side-by-side in parallel, but the electrical connection of the batteries 64 is generally connected in series to provide a summed voltage output from both batteries. The batteries 64 that are used to power the lighting device 10 are installed with the positive terminal 65A inserted first such that the negative terminal end 65B is at the bottom or rear end and in contact with the negative contact springs 72A and 72B.

Also disposed within the main housing body 12 of the lighting device 10 are a number of circuit components including a circuit board 120 having components assembled thereto including control circuitry 200 and a switch board 121 having switches 42, 44 and 46 assembled thereto.

Circuit board 120 and switch board 121 sandwich member 112 and are electrically connected to allow switch signals to pass to the control circuitry 200. The control circuitry 200 includes a microprocessor, according to one embodiment. However, it should be appreciated that other forms of circuitry including an application specific integrated circuit (ASIC) or other analog and/or digital circuitry may be employed. The control circuitry 200 controls various aspects of activating the light sources, adjusting intensity or brightness, and controlling the modes of operation as explained herein.

Also disposed within the body 12 of lighting device 10 are electrically conductive circuit elements that provide electrical power from one or more batteries 64 to the control circuitry 200 and to power the light sources 20, 22, 24, 26 and 28. The electrically conductive elements include a flat ribbon or strip 114 having a plurality of circuit elements formed as circuit traces packaged within a non-conductive strip. According to one embodiment, four circuit traces are provided within the ribbon strip 114. Two of the circuit traces in the ribbon strip 114 are connected to the bottom switch 48 assembled in the tail cap 16. A first conductive strip is in contact with a first contact of switch 48 and a second conductive strip is in contact with a second contact of the switch 48. The third conductive strip is in contact with the first negative battery contact spring 72A and the fourth conductive strip is in electrical contact with the second negative battery terminal contact spring 72B. Accordingly, the signals across the switch 48 and at the negative terminal of each of the two batteries 64 is supplied to the control circuitry 200 by way of the ribbon strip 114. The control circuitry 200 thereby can determine the state of switch 48 and can provide an electrical connection to each battery 64.

The control circuitry 200 processes the battery power output and provides a sufficient power supply to power each of the light sources 20, 22, 24, 26 and 28, when they are turned on.

To supply power from the main body 12 to the swivel head 20, a plurality of wires 82 extend from the control circuitry 200 through one side of the swivel connection in slot 35 of the left pivot connector 34 which extends through opening 15 in arm 14A as shown in FIG. 7B. The bundle of wires 82 extend into the interior of the swivel head 20. The plurality of wires 82 are packages together in a bundle and extend through the swivel head 20 in a seal tight manner so as to prevent moisture from entering the compartment within the swivel head 20. According to one embodiment, the plurality of wires 82 employ eight or ten wires sufficient to allow electric current to flow individually to each of the LEDs 22, 24, 26, 28 and 30. However, it should be appreciated that a different number of wires may be employed, according to other embodiments.

According to an alternate embodiment, a pair of wires may be employed to transmit power and data between the control circuitry 200 and the swivel head 20. In this embodiment, separate control circuitry may be included in the swivel head 20 so as to allow for the receipt and transmission of data and power supplied by way of the pair of wires. By reducing the number of wires to a pair of wires, the lighting device 10 may be more easily manufactured and fewer wires allows for improved ability to ensure that the main body 12 and swivel head 20 have a waterproof closure.

Figures 9, 9A:
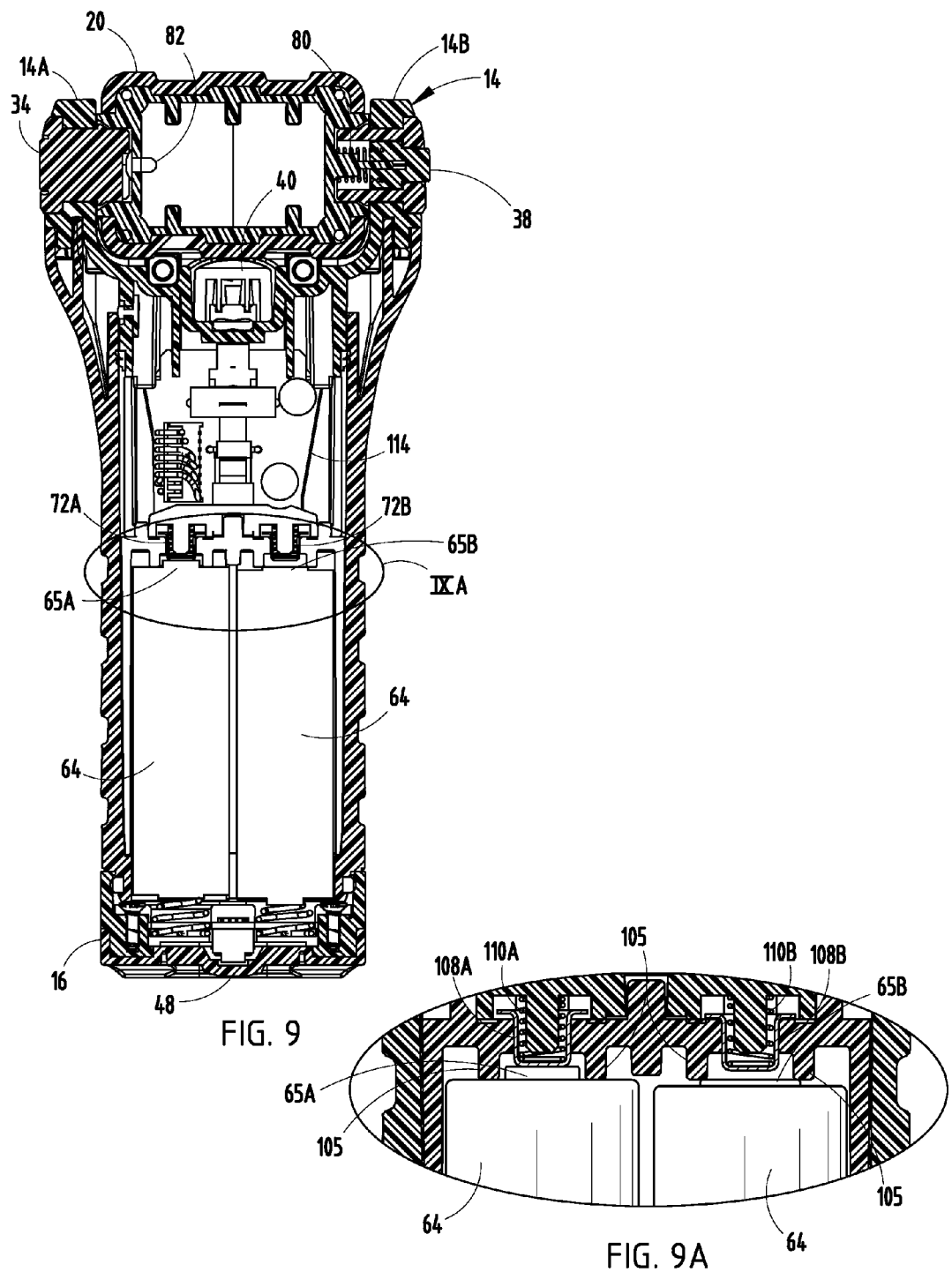
FIG. 9 is a cross-sectional view of the lighting device taken through line VIII-VIII of FIG. 4 showing one battery in a reverse oriented storage position.
FIG. 9A is an enlarged view of section IX-IX taken through line FIG. 9 showing the electrical connection of the batteries to electrical circuitry in the lighting device.

Referring to FIGS. 8-9A, a pair of batteries 64 is shown installed within the battery cartridge 100 of the lighting device 10 in a dual battery operation mode in FIGS. 8 and 8A and a single battery operation mode in FIGS. 9 and 9A. The battery cartridge 100 is adapted to receive first and second batteries 64 within corresponding first and second battery compartments 102A and 102B, according to the disclosed embodiment. Each of the batteries 64 is intended to be installed in the same orientation, such that the positive terminal 65A of each battery 64 is installed into the battery cartridge 100 first so that the negative terminal 65B of batteries 64 contact the negative terminal springs 72A and 72B. The positive terminal 65A of each battery 64 has a protruding nubbin in the central region that is distinguished from the negative terminal 65B having a more flat bottom. The battery cartridge 100 is configured to allow the lighting device 10 to be powered by both the first and second batteries 64 when the positive terminal 65A of both batteries 64 is installed properly such that the protruding nubbins 65A of batteries 64 contact respective electrically conductive cups 108A and 108B, which are spring biased by the springs 110A and 110B, respectively. The protruding nubbin 65A of each battery 64 extends within a region between an inward protruding rib or ring member 105 to contact the conductive cup 108A or 108B as shown in FIG. 8A, which provides for an electric circuit connection to supply power from both of the batteries 64 to power the lighting device 10. The inward protruding members 180 have a ring shape with an inside diameter sufficiently large to allow the protruding nubbin 65A of each battery 64 to extend into contact with the corresponding conductive cup 108A or 108B, but prevent the negative terminals 65B of batteries 64 from contacting the corresponding conductive cups 108A or 108B.

When one of the batteries 64 is installed in a reverse orientation direction such that the negative terminal 65B is inserted first into the battery compartment 100, the negative terminal end 65B of the battery 64 directly engages the inward protruding ring member 105 which prevents electrical contact between the battery negative terminal 65B and the electrically conductive cup 108B as shown in FIGS. 9 and 9A for the battery 64 on the right side. When this occurs, the battery 64 installed in the reverse orientation direction does not contact electrical circuit elements and therefore does not provide a power output for powering or operating the lighting device 100, but instead is merely stored in a non-use position within the battery cartridge 100. Provided that the one other battery 64 is properly installed in the battery cartridge 100, the lighting device 10 may be operated from the single properly installed battery 64. It should be appreciated that a user may intentionally install one battery 64 in a reverse orientation so that the reverse oriented battery 64 is considered a storage battery that is not used as the power source. In doing so, the lighting device 10 may be powered with a single battery until the one battery is drained, and then a user will know that about half of the available power has been used and may switch the orientation of the improperly installed battery so as to use the storage battery to power the light device 10 thereafter.

It should be appreciated that by configuring the battery compartment 100 to receive multiple batteries 64 arranged in parallel, but electrically connected in series, and installed in the same orientation within the battery cartridge 100, a user may easily install batteries into the lighting device 10 in the dark knowing that the battery orientation is proper. This allows for ease in changing batteries 64 and enhanced overall use of the lighting device 10.

Figure 10:
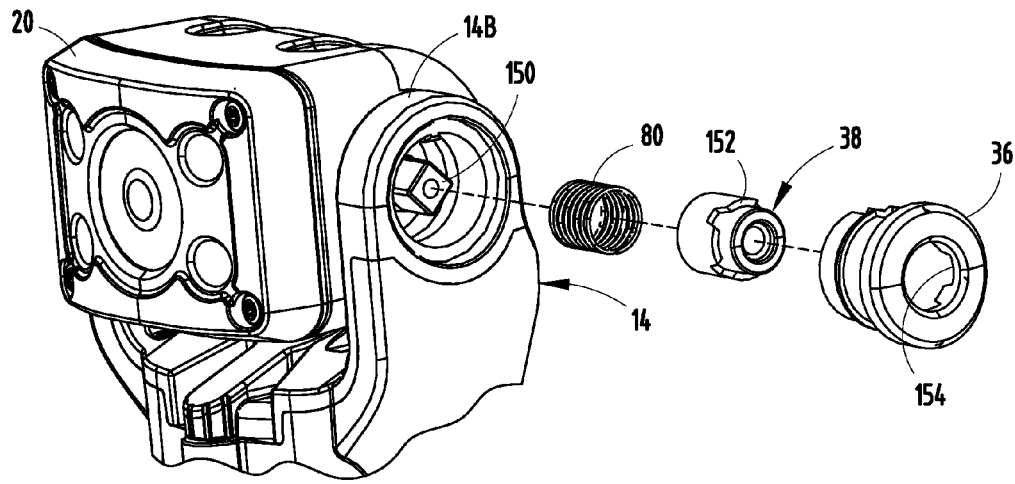
FIG. 10 is a perspective view of the swivel head with the right pivot connector of the head attachment mechanism exploded.
Figure 11A:
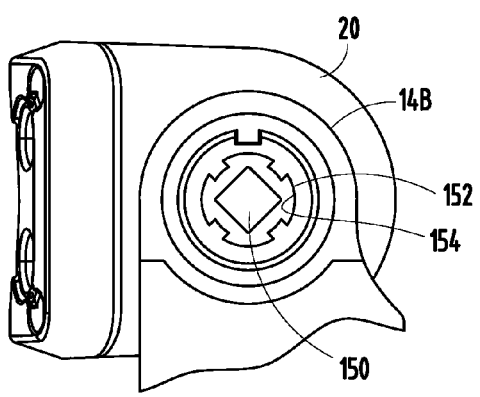
FIG. 11A is a side view of the swivel head shown in the first locked position.
Figure 11B:
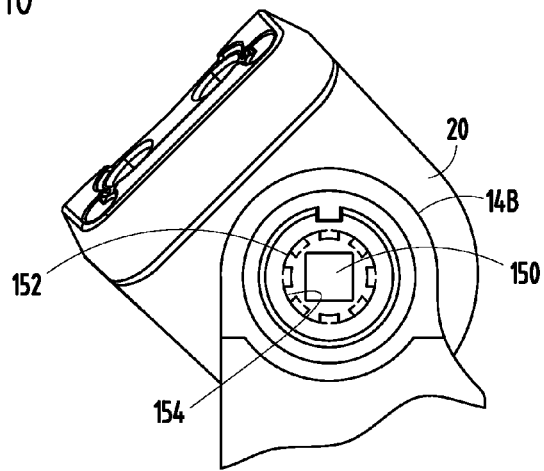
FIG. 11B is a side view of the swivel head shown in an intermediate position.
Figure 11C:
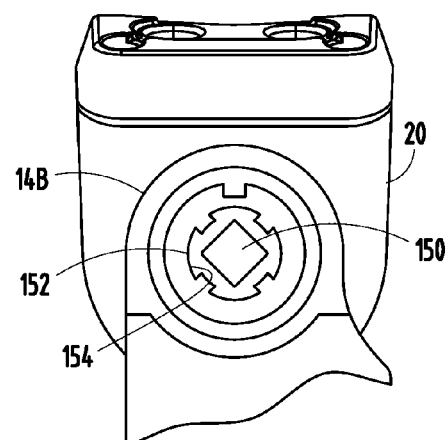
FIG. 11C is a side view of the swivel head shown in a second locked position.

Referring to FIGS. 10-12B, the swivel head 20 and its rotational positioning with respect to the main body 12 are further illustrated. As seen in FIG. 10, the right pivot connection 36 is shown having a plurality of detents 154 formed in an inner surface. In the embodiment shown, the detents 154 align with teeth 152 in the push button release mechanism 38 to provide locking positions ninety degrees (90°) apart from one another such that the swivel head 20 may be locked in the first position shown in FIGS. 10 and 11A, which is ninety degrees (90°) relative to the longitudinal axis of the body 12, and may further be rotated ninety degrees (90°) and locked into the second position shown in FIG. 11C which is aligned with the longitudinal axis of the body 12. The push button release mechanism 38 that is actuated by a user is shown including a plurality of teeth 152 which engage detents 154 in connection 36 in either of the locked positions. It should be appreciated that the detents and the teeth may be switched such that the detents 154 are provided in the push button release mechanism 38 and the teeth 152 are provided in the pivot connection 36. Further, it should be appreciated that both detents and teeth may be provided on both of the push button release mechanism 38 and pivot connection 36, such that the detents and teeth correspondingly mate in the locked swivel head positions.

Figure 12A:
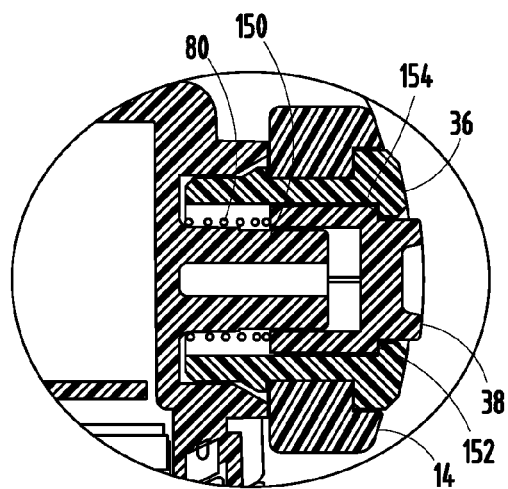
FIG. 12A is a cross-sectional view taken through line XII-XII of FIG. 3 showing the right pivot connector of the head attachment assembly in a locked position.
Figure 12B:
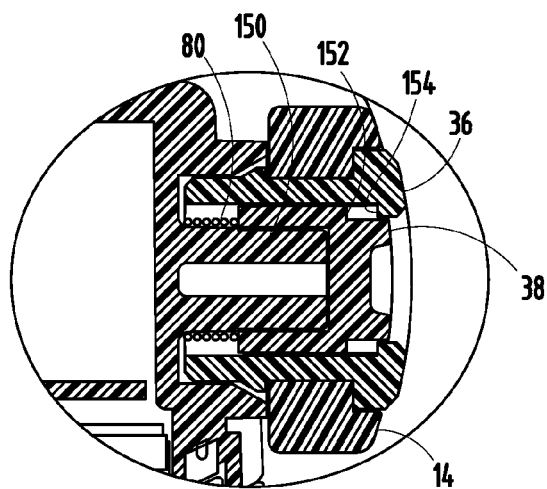
FIG. 12B is a cross-sectional view taken through line XII-XII of FIG. 3 showing the right pivot connector of the head attachment assembly in an unlocked position.

Push button release mechanism 38 is assembled onto the square pin 150 of the head attachment mechanism 32. It should be appreciated that pin 150 may be otherwise configured to have a plus (+) shape or other shape. Push button release mechanism 38 rotates with swiveling movement of the head 20. A spring 80 biases the push button release mechanism 38 outward and is compressible upon sufficient actuation from a user so as to disengage teeth 152 from detents 154 to allow rotational movement of head 20. The swivel head 20 may be oriented at ninety degrees (90°) relative to the longitudinal axis of the body 12 as shown in FIG. 1B. Upon depression of switch 38 as shown in FIG. 12B, the teeth 152 become disengaged from detents 154 and the swivel head 20 is rotated and may be moved through intermediate positions, such as the position shown in FIG. 1B. In an intermediate position, the teeth 152 are not engaged within detents 154 such that the pivot head 20 is not in a locked position. Upon sufficient rotation of the swivel head 20 by ninety degrees (90°) to the second locked position relative to the first locked position aligned with the longitudinal axis of the main body 12, the teeth 152 may be biased back into engagement with detents 154 to lock the swivel head 20 into the second position as shown in FIG. 1C. As seen in FIG. 12A, the spring 80 biases the push button 38 back to the outward position. The left side of the head attachment mechanism 32 has a left pivot connection 34 in the form of a pin that allows the swivel head 20 to swivel.

The swivel head 20 fits into place into the first or second locked positions. In the first locked position, the swivel head 20 projects light illumination in a direction substantially perpendicular to the longitudinal axis of the main body 12. By locking the swivel head 20 into the first locked position, the lighting device 10 may be installed onto a mounting structure, such as an article of clothing, and may withstand forces that impact the lighting device 10, such as forces experienced while the lighting device 10 is in motion. Similarly, with the swivel head 20 in the second position such that light illumination projects substantially parallel to the longitudinal axis of the main body 12, the second locked position maintains the swivel head 20 in position sufficient to withstand forces acting upon the swivel head. For example, the lighting device 10 may be mounted to a firearm or other weapon and the locking mechanism sufficiently maintains the swivel head 20 in position and is sufficient to withstand the recoil forces experienced during firing of the weapon.

To accommodate the attachment or mounting of the lighting device 10 to another structure, the light body 12 is shown equipped with a clip 76 installed on the back wall of the body 12 as shown in FIGS. 4 and 5. The clip 76 may be in the form of a bent wire as shown in FIG. 7C and is connected to the body 12 by way of a clip bracket 78. It should be appreciated that the clip 76 may bend outward from the end opposite the clip bracket 78 to allow for engagement with a member, such as a shirt pocket such that the clip 76 holds the lighting device 10 in position relative to the other structure. It should be appreciated that other clip attachments and mounting structures may be employed to support the lighting device 10 attached onto a structure.

Figure 13:
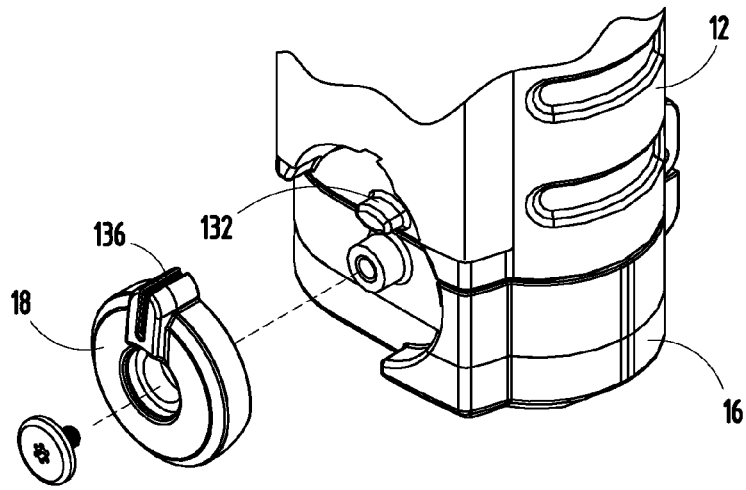
FIG. 13 is a perspective view of the tail cap showing the cam lock wheel mechanism exploded.
Figure 14:
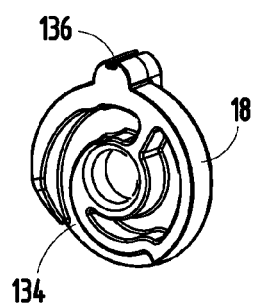
FIG. 14 is a perspective view on the inside of the cam lock wheel mechanism shown in FIG. 13.

Referring to FIGS. 13 and 14, the cam lock wheel mechanism 18 is shown assembled to the end cap 16. The cam lock wheel mechanism 18 includes a lever 136 extending from the periphery that allows the user to easily engage and rotate the cam lock wheel 18. The cam lock wheel 18 is assembled to the end cap 16 by a fastener such as a screw. As seen in FIG. 14, the cam lock wheel 18 has an internal barrel cam 134 in the form of a groove or slot that is spiraled inward from the periphery. The internal barrel cam 134 is positioned to engage an outward protruding member, such as tooth 132, provided on the main body 12 to close the end cap 16 and provide a sealed and locked closure.

The opening and closing operation of the tail cap 16 is further illustrated in FIGS. 15-23.

Figure 15:
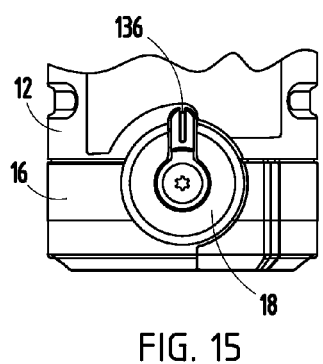
FIG. 15 is a front view of the tail cap assembly shown in the closed position.
Figure 16:
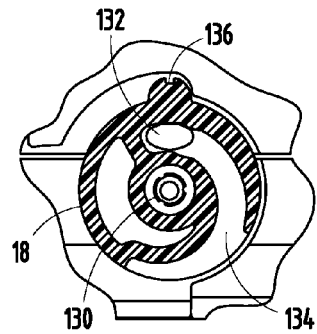
FIG. 16 is a partial cross-sectional view taken through the cam lock wheel of FIG. 15 showing the locking engagement of the tail cap.
Figure 17:
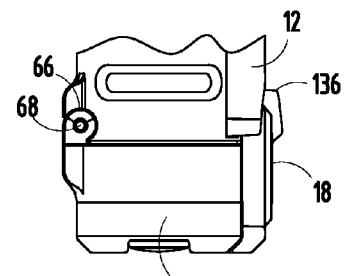
FIG. 17 is a side view of the tail cap shown in the closed position.
Figure 18:
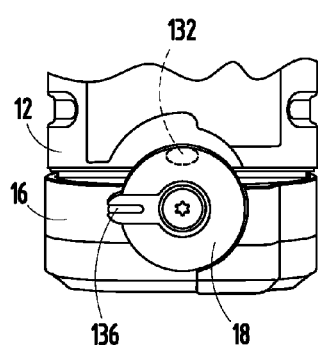
FIG. 18 is a front view of the tail cap assembly shown in an intermediate partial open position.
Figure 19:
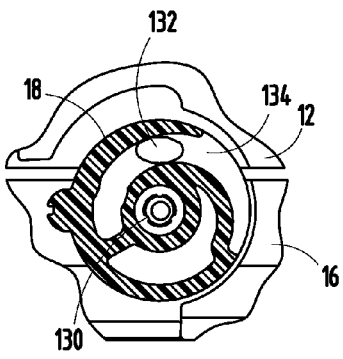
FIG. 19 is a partial cross-sectional view through the cam lock wheel mechanism of FIG. 18 in the partial open position.
Figure 20:
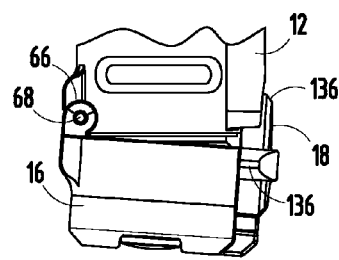
FIG. 20 is a side perspective view of the tail cap assembly in a partial open position.
Figure 21:
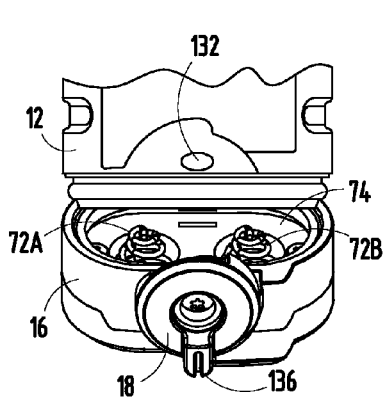
FIG. 21 is a front view of the tail cap illustrated in an open position.
Figure 22:
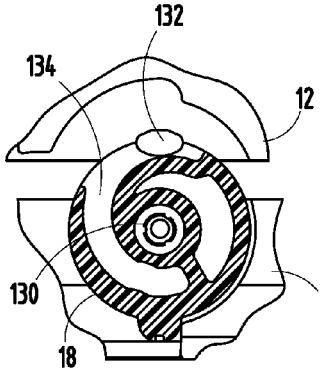
FIG. 22 is a partial cross-sectional view of the cam lock wheel mechanism shown in the open position.
Figure 23:
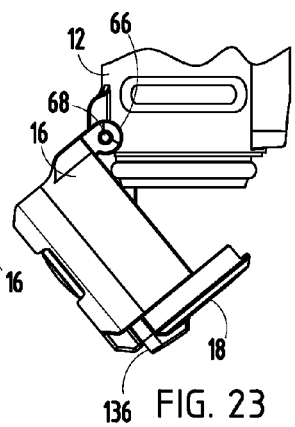
FIG. 23 is a side view of the tail cap assembly shown in an open position.

As seen in FIG. 15, the end cap 16 is in a fully closed position with the cam lock wheel 18 rotated fully clockwise so that lever 136 is in the vertical position. In this position, the internal barrel cam 134 substantially fully engages the protruding tooth 132 on housing 12 such that the end cap 16 is pulled toward main body 12 due to the internal cammed surface of cam lock wheel 18. In this position, the end cap 16 forms a sealed closure to the battery compartment as shown in FIG. 17. To open the end cap 16, a user rotates the cam lock wheel 18 counterclockwise. As seen in FIG. 18, the cam lock wheel 18 is turned one quarter of a turn (90°) counterclockwise to a partial open position. In this position, the cam surface of cam lock wheel 18 allows the end cap 16 to move away from the tooth 132 engaged within the cam surface 134. As such, the end cap 16 may be partially opened as shown in FIG. 20. To fully open the end cap 16, the cam lock wheel 18 is rotated further counterclockwise as shown in FIG. 21 to complete a half rotation (180°) relative to the fully locked position. In this position, the tooth 132 is clear of the cam surface 134, such that the cam lock wheel 18 and end cap 16 are no longer engaged on one side to the main body 12 such that the end cap 16 may be pivoted about hinge members 66A and 66B as shown in FIG. 23.

With the end cap 16 in the open position, the batteries may be replaced. It should further be appreciated that the ribbon connector 114 extends from within an internal wall of the main body 12 and into the end cap 16 where connections are made. The ribbon connector 114 may slidingly move in and out of the main body 12 via an opening as the end cap 16 is pivoted between the open and closed positions.

Figures 6, 6A:
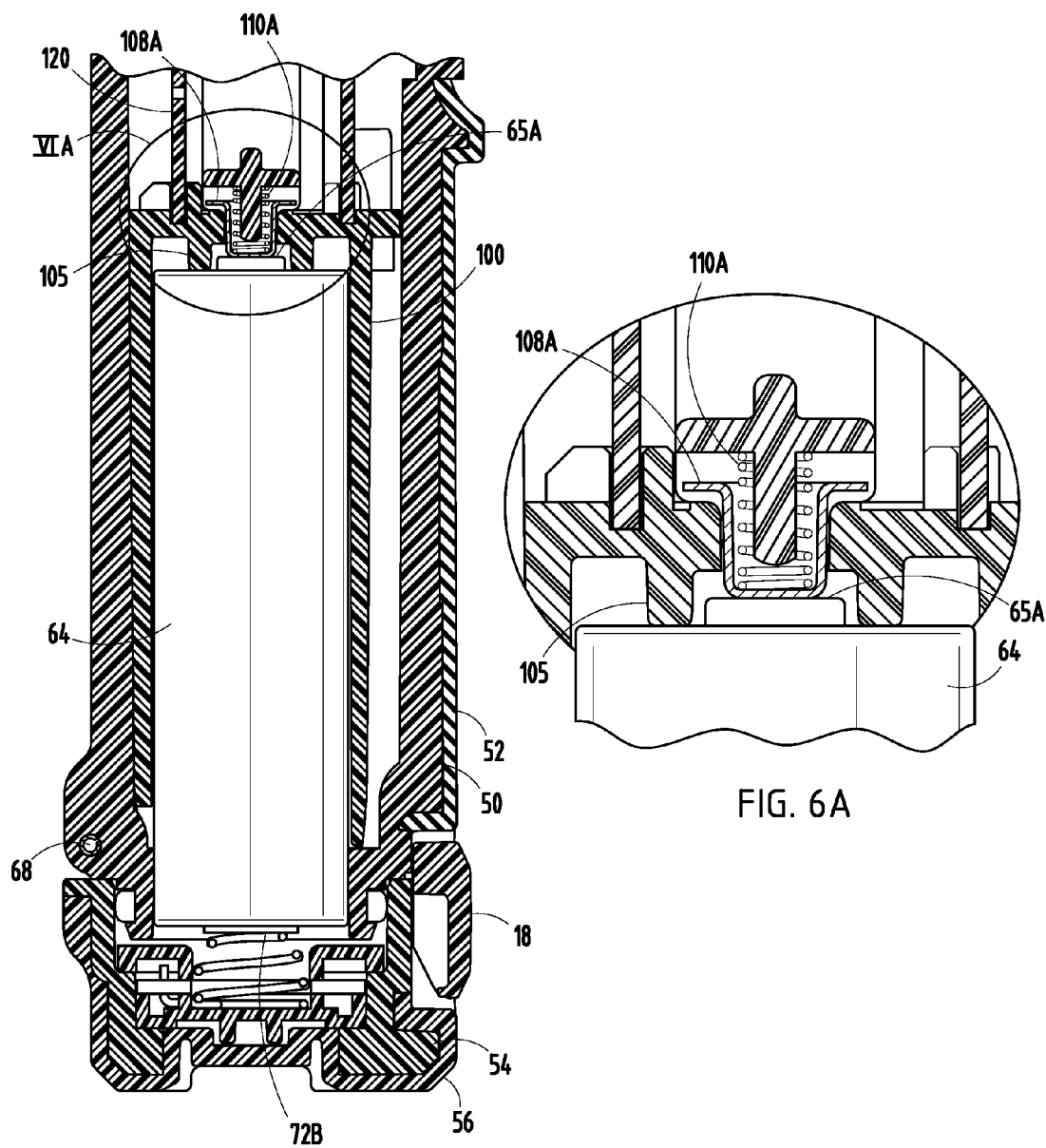
FIG. 6 is a cross-sectional view of the lower portion of the lighting device taken through line VI-VI of FIG. 3.
FIG. 6A is an enlarged view of section VIA of FIG. 6 illustrating electrical connection of the positive terminal of a battery to electrical circuitry.

The lighting device 10 is made of a substantially rigid polymeric material capable of withstanding large forces such as those encountered when dropped or loads under abusive conditions. The body 12 is formed of a rigid polymeric material 50 which may include a blend of ABS and polycarbonate, according to one embodiment. The soft elastomeric material 52 may include soft durometer material, such as TPE. Portions of the main body 12, particularly the front portion and push button switches 42, 44 and 46 have an overmolded soft elastomeric material 52 overmolded onto the rigid polymeric material 50 as shown in FIG. 6. Similarly, the tail cap 16 has a rigid polymeric layer 54 and a bottom portion is overmolded with a soft elastomeric layer 56. The head cap 20 likewise includes a hard polymeric layer 58 overmolded with a soft elastomeric layer 60. The soft elastomeric overmolded material of layers 52, 56 and 60 advantageously absorb forces during impact and provide for an enhanced feel that is easy and comfortable to grip. In the embodiment shown, the yoke portion 14 is shown as a separate piece which connects to the main body 12. It should be appreciated that the yoke portion 14 and main body 12 are adapted and connect together and may include a seal disposed therebetween to provide a sealed closure. The yoke portion 14 may be made of a rigid polymeric material, according to one embodiment. It should be appreciated that the yoke portion 14 may otherwise be integrally formed as part of the main body, according to an alternate embodiment.

Figure 24:
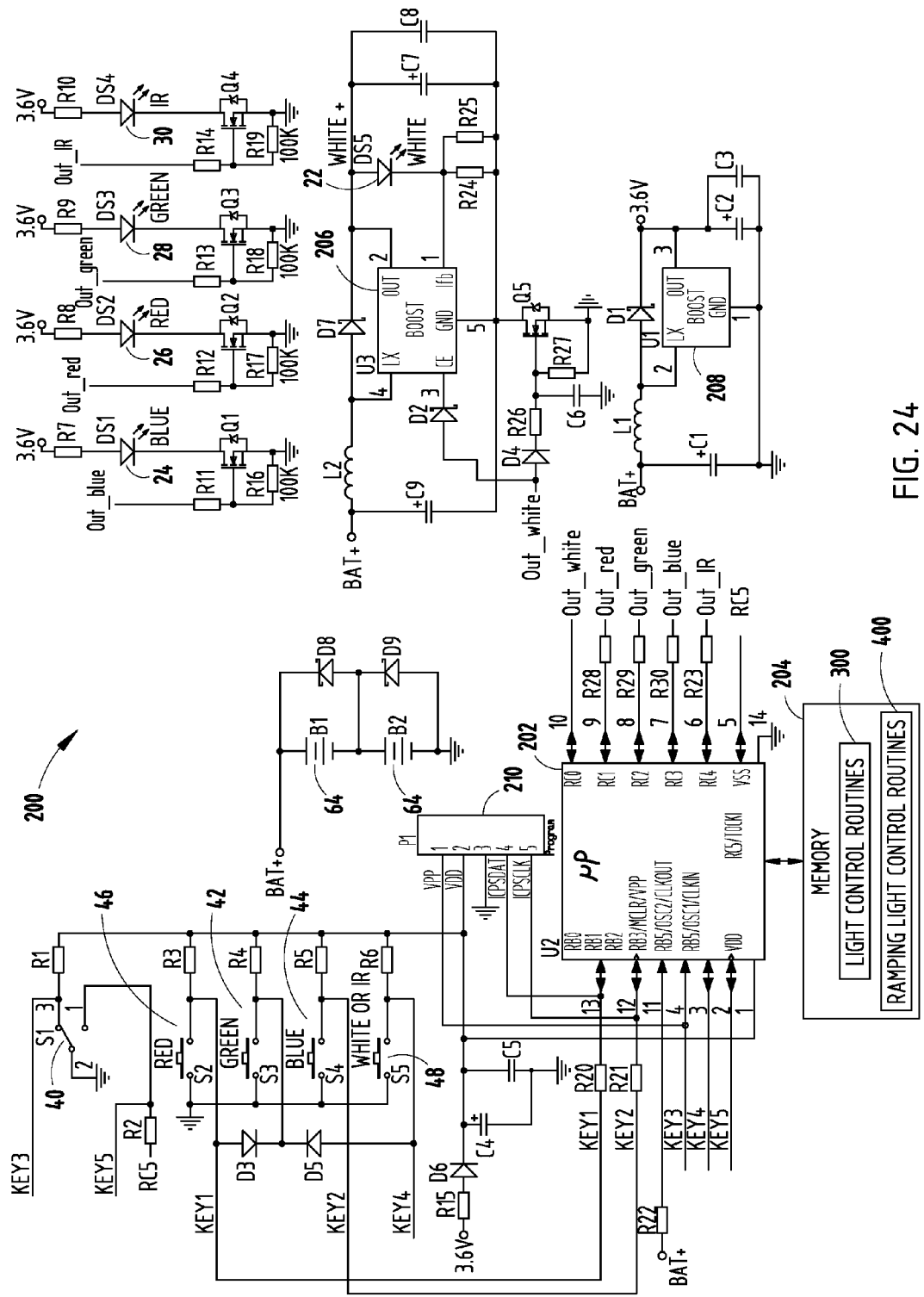
FIG. 24 is a circuit diagram illustrating control circuitry for controlling the various lighting sources of the lighting device, according to one embodiment.

The lighting device 10 includes control circuitry 200 for controlling operation of the light sources 22, 24, 26, 28 and 30. The control circuitry 200 is generally illustrated in FIG. 24 having a pair of boost circuits, according to one embodiment. As seen in FIG. 24, the control circuitry 200 includes a microprocessor 202 coupled to memory 204. The microprocessor 202 may include any signal processing device capable of processing switch inputs, executing routines, and generated control signals, as described herein. Memory 204 may include volatile and non-volatile memory devices, such as electronically erasable programmable read-only memory (EEPROM), flash memory, or other known memory devices. Stored within memory 204 are a plurality of routines including one or more light control routines 300 and ramping light control routines 400. The light control routines 300 are executed by the microprocessor 202 to control activation of the various light sources based on activation of the various switches. The ramping light control routines 400 provide a ramped adjustment of the intensity (for brightness) of the light sources, according to one embodiment.

The control circuitry 200 includes boost control circuitry for supplying a substantially constant current to power the main white LED 22, and provides a substantially constant voltage of approximately 3.6 volts to power the control circuitry, including the microprocessor 202, and the remaining LEDs 24, 26, 28 and 30, according to the disclosed embodiment.

The control circuitry 200 illustrates first and second batteries 64 electrically connected in series to provide a summed power source voltage BAT+. Given that each single cell battery 64 typically outputs a voltage of approximately 1.5 volts, the sum total voltage BAT+ for two series connected batteries is approximately 3.0 volts. Connected in parallel to the first and second batteries 64 are a pair of series connected diodes D8 and D9, which serve as protective devices to prevent shorting of the batteries 64. It should be appreciated that if one of the batteries 64 is installed in the lighting device 10 in a reverse orientation such that it is in a stored non-used orientation, then the other battery 64 solely provides the battery voltage output BAT+, which is typically about 1.5 volts. The battery output BAT+ is supplied to first boost circuitry 206 and second boost circuitry 208. Additionally, the microprocessor 202 senses the battery voltage BAT+ at input pin RB2.

The various switches 40, 42, 44, 46 and 48 are shown connected in the control circuitry 200. The three-position toggle switch 40 is shown having a first switch position that grounds out signal key3, a second position that is not connected to the control circuitry, and a third position that grounds out signal key5. The microprocessor 202 senses signals key3 and key5, and thereby determines which position the toggle switch 40 is in based on the sensed signals.

Switch 46 closes out the connection between ground and voltage VDD passing through resistor R3 and provides a grounded signal key1 when switch 46 is depressed. Signal key1 is sensed by the microprocessor 202. Switch 42 closes the connection between ground and voltage VDD through resistor R4 when switch 42 is depressed and provides a grounded signal through signals key1 and key4, both of which are detected by microprocessor 202. Switch 44, when depressed, closes the connection between ground and voltage VDD through resistor R5 and provides a grounded signal key2 which is sensed by microprocessor 202. Switch 48, when depressed, provides a connection between ground and voltage VDD such that signal key4 is grounded, which is detected by microprocessor 202. By sensing signals key1, key2 or key4, the microprocessor 202 is able to determine whether any of the switches 40, 42, 44, 46 and 48 are depressed.

The first boost circuitry 206 receives the summed battery voltage BAT+ at inductor L2 across capacitor 96 and generates a substantially constant current through diode D7 which is supplied to the main white LED 22. In doing so, the microprocessor 202 provides a pulse width modulated (PWM) output signal on pin RCO which is supplied through diode D2 to the enable input (CE) of the first boost circuitry 206. The first boost circuitry 206 in turn generates a pulse frequency modulated (PFM) output on output pin OUT which is supplied to power the main white LED 22. The first boost circuitry 206 may receive a feedback signal from current sensing resistors R24 and R25. The capacitors C7 and C8 are connected across the LED 22 to provide a stable output. The second boost circuitry 208 receives the summed battery voltage BAT+ at inductor L1 across capacitor C1. The second boost circuitry 208 generates a substantially constant voltage of approximately 3.6 volts passing through diode D1. The substantially constant 3.6 volts is then used to power the control circuitry, including the microprocessor 202, and to power the remaining LEDs 24, 26, 28 and 30.

LED 24 is shown receiving a blue output signal (out blue) from pin RC3 of the microprocessor 202 to turn the blue LED 24 on. The red LED is turned on when the microprocessor 202 outputs an output signal (out red) on pin RC1. The green LED 28 is turned on when the microprocessor 202 outputs a green output signal (out green) on pin RC2. The IR LED 30 is turned on when the microprocessor 202 outputs a signal (out IR) on pin RC4. It should be appreciated that the intensity of each of the blue LED 24, red LED 26, green LED 28 and IR LED 30 may be adjusted by the microprocessor 202 providing a pulse width modulated signal and changing the pulse width modulated signal to adjust the intensity of each LED.

It should be appreciated that the boost circuitry boosts a voltage output of one or more batteries to power the light source. The control circuitry may be employed to control the boost circuitry to boost the voltage output to power the light source. In doing so, the summed total voltage output of the power source may be detected and the pulse width modulated signal adjusted based on the detected voltage. While the first and second boost circuitry is shown and described herein as including an inductor, it should be appreciated that other energy conversion elements may be employed, according to other embodiments. For example, the boost circuitry may employ one or more capacitive charge pumps to convert energy provided by one or more the batteries to a form suitable for powering the light source(s). A capacitive charge pump may use one or more charge pump capacitors to convert the energy.

The control circuitry 200 advantageously detects whether a single battery or multiple batteries are connected in series in the lighting device 10 to supply power to operate the light sources and control circuitry. While one or two batteries 64 are shown and described herein for operating the lighting device 10, it should be appreciated that the lighting device 10 may be configured to receive more than two batteries and may be powered by three or more batteries. Additionally, it should be appreciated that the boost circuitry advantageously adjusts the output voltage and current supplied to power the light sources. In doing so, the lighting device 10 is generally more efficient at boosting a higher voltage such as three volts, as opposed to a single battery output voltage of 1.5 volts. The control circuitry 200 may receive any of a number of voltages and convert the voltage to a useful voltage and current for powering the lighting sources and control circuitry.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A lighting device comprising:
    a light source;
    a housing generally having walls defining a cavity adapted to receive a plurality of batteries such that one or more of the plurality of batteries may serve as a power source to power the light source; and
    boost circuitry for boosting a voltage output, of the one or more batteries to power the light source, wherein the light source is configured to be powered by one number of batteries supplying a first voltage output and is configured to be powered by a second different number of batteries supplying a second different voltage output;
    wherein the housing cavity comprises a first battery compartment for receiving a first battery and a second battery compartment for receiving a second battery wherein the first battery compartment comprises a first contact that is in a contact state when the first battery is properly positioned within the first battery compartment, and wherein the second compartment comprises a second contact that is in a contact state when the second battery is properly positioned within the second battery compartment;
    wherein the first and second contacts of the first and second battery compartments are in a non-contact state when the corresponding first or second battery is not properly inserted in the respective first or second battery compartments; and
    wherein the lighting device is powered by only one battery in the first battery compartment and the second battery compartment serves as a storage compartment for the second battery as a reserve battery.

2. A lighting device comprising:
    a light source;
    a housing generally having walls defining a cavity adapted to receive a plurality of batteries such that one or more of the plurality of batteries may serve as a power source to power the light source; and
    boost circuitry for boosting a voltage output of the one or more batteries to power the light source, wherein the light source is configured to be powered by one number of batteries supplying a first voltage output and is configured to be powered by a second different number of batteries supplying a second different voltage output;
    wherein the boost circuitry comprises first boost circuitry for providing a substantially constant voltage output and second boost circuitry for supplying a substantially constant current output; and
    wherein the light source comprises a plurality of light emitting diodes comprising a first LED and a second LED, wherein the first LED is powered by the substantially constant voltage output and the second LED is powered by the substantially constant current output.

3. The lighting device as defined in claim 2, wherein an output intensity of the light source may be adjusted.

4. A lighting device comprising:
    a light source;
    a housing generally having walls defining a cavity adapted to receive a plurality of batteries such that one or more of the plurality of batteries may serve as a power source to power the light source;
    a first battery compartment configured to receive at least a first battery, said first battery compartment comprising a first contact that is in a contact state when the at least first battery is properly positioned in the first battery compartment and is in a non-contact state when the at least first battery is not properly positioned in the first battery compartment;
    a second battery compartment configured to receive at least a second battery, said second battery compartment comprising a second contact that is in a contact state when the second battery is properly positioned within the second battery compartment and is in a non-contact state when the at least second battery is not properly positioned in the second battery compartment; and
    wherein the first and second battery compartments are physically arranged in parallel, and wherein the at least first battery and the at least second battery are electrically coupled in series.

5. The lighting device as defined in claim 4 further comprising one or more electrical connectors adapted to electrically couple the at least the first battery and the at least the second battery in series when the at least the first and the at least the second batteries are oriented properly.

6. A lighting device comprising:
    a light source;
    a housing generally having walls defining a cavity adapted to receive a plurality of batteries such that one or more of the plurality of batteries may serve as a power source to power the light source;
    a first battery compartment configured to receive at least a first battery, said first battery compartment comprising a first contact that is in a contact state when the at least first battery is properly positioned in the first battery compartment and is in a non-contact state when the at least first battery is not properly positioned in the first battery compartment;
    a second battery compartment configured to receive at least a second battery, said second battery compartment comprising a second contact that is in a contact state when the second battery is properly positioned within the second battery compartment and is in a non-contact state when the at least second battery is not properly positioned in the second battery compartment; and
    boost circuitry for boosting an output of one or more of the first and second batteries to power the light source.

7. The lighting device as defined in claim 6 further comprising control circuitry for controlling the boost circuitry to boost the voltage output to power the light source, wherein the light source is configured to be powered by one number of batteries supplying a first voltage output and is configured to be powered by a second different number of batteries supplying a second different voltage output.

8. The lighting device as defined in claim 7, wherein the control circuitry detects the supply of power from one or more batteries and controls the boost circuitry.

9. The lighting device as defined in claim 6, wherein the boost circuitry comprises an inductor.

10. The lighting device as defined in claim 6, wherein the boost circuitry comprises first boost circuitry for providing a substantially constant voltage output and second boost circuitry for supplying a substantially constant current output.

11. The lighting device as defined in claim 10, wherein the light source comprises a plurality of light emitting diodes comprising a first LED and a second LED, wherein the first LED is powered by the substantially constant voltage output and the second LED is powered by the substantially constant current output.

12. A lighting device comprising:
- a light source;
- a housing generally having walls defining a cavity adapted to receive a plurality of batteries such that one or more of the plurality of batteries may serve as a power source to power the light source;
- a first battery compartment configured to receive at least a first battery, said first battery compartment comprising a first contact that is in a contact state when the at least first battery is properly positioned in the first battery compartment and is in a non-contact state when the at least first battery is not properly positioned in the first battery compartment
- a second battery compartment configured to receive at least a second battery, said second battery compartment comprising a second contact that is in a contact state when the second battery is properly positioned within the second battery compartment and is in a non-contact state when the at least second battery is not properly positioned in the second battery compartment; and
- wherein an output intensity of the light source may be adjusted.

13. A lighting device comprising:
- a light source;
- a housing generally having walls defining a cavity adapted to receive a plurality of batteries such that one or more of the plurality of batteries may serve as a power source to power the light source;
- a first battery compartment configured to receive at least a first battery, said first battery compartment comprising a first contact that is in a contact state when the at least first battery is properly positioned in the first battery compartment and is in a non-contact state when the at least first battery is not properly positioned in the first battery compartment;
- a second battery compartment configured to receive at least a second battery, said second battery compartment comprising a second contact that is in a contact state when the second battery is properly positioned within the second battery compartment and is in a non-contact state when the at least second battery is not properly positioned in the second battery compartment; and
- wherein the lighting device is powered by only one battery in the first battery compartment and the second battery compartment serves as a storage compartment for the second battery as a reserve battery.

* * * * *